April 15, 1930. B. G. JAMIESON 1,754,515
ELECTRIC POWER DISTRIBUTION
Filed Aug. 11, 1924 4 Sheets-Sheet 4
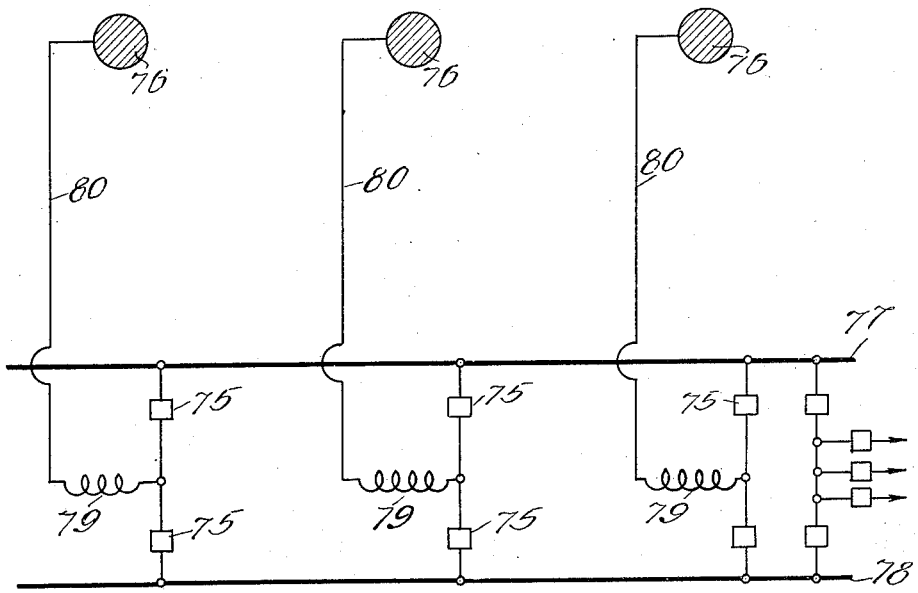
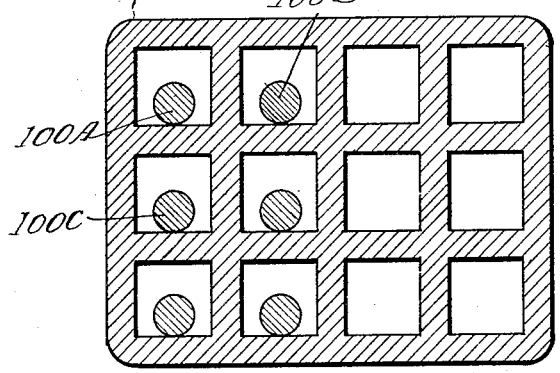
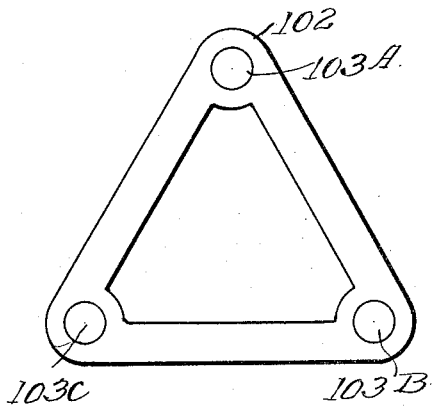
Witnesses
Harry P. Leslie
W. P. Kilroy
Inventor
Bertrand G. Jamieson
By Brown Boettcher Dienner
Attys Patented Apr. 15, 1930

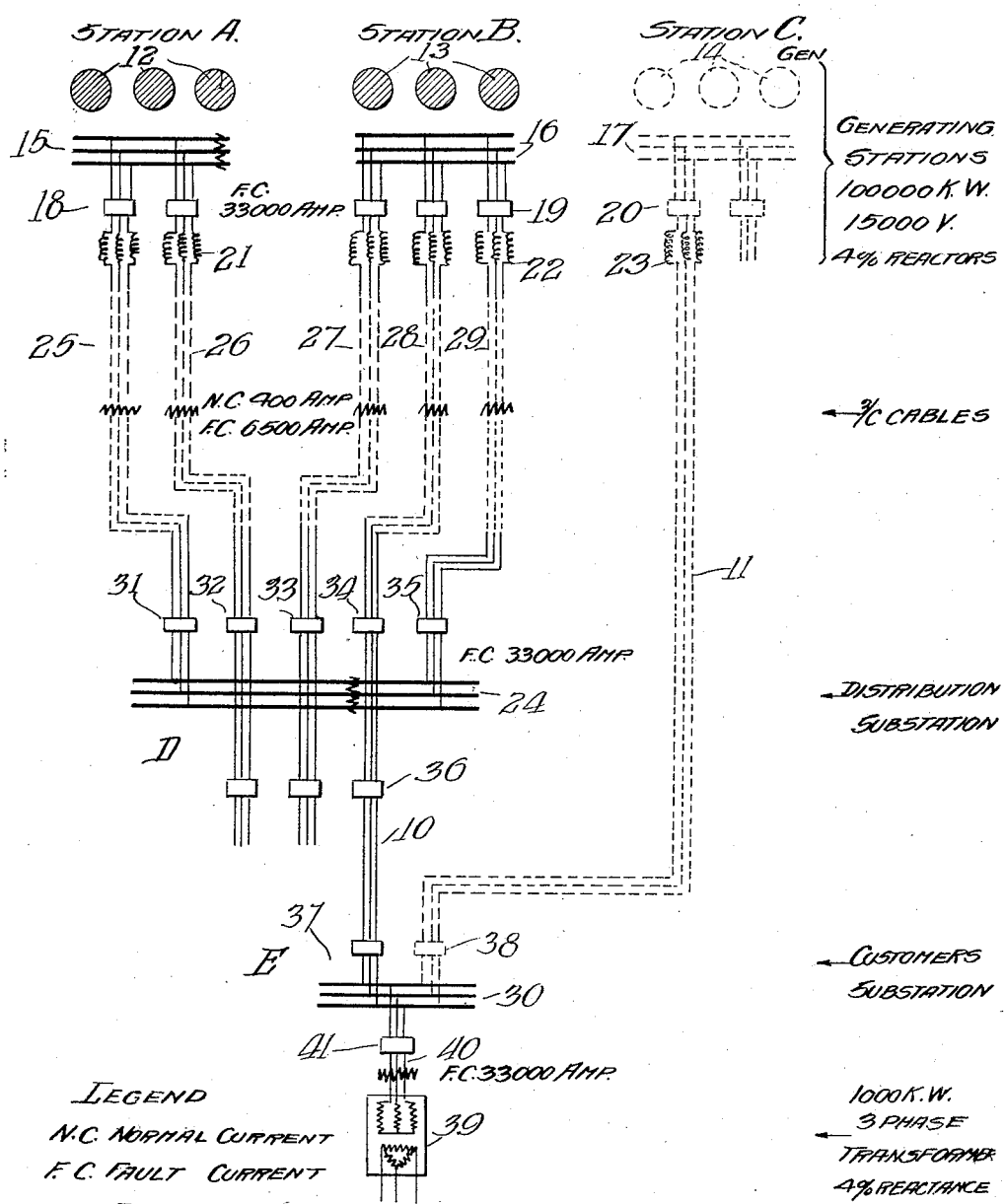

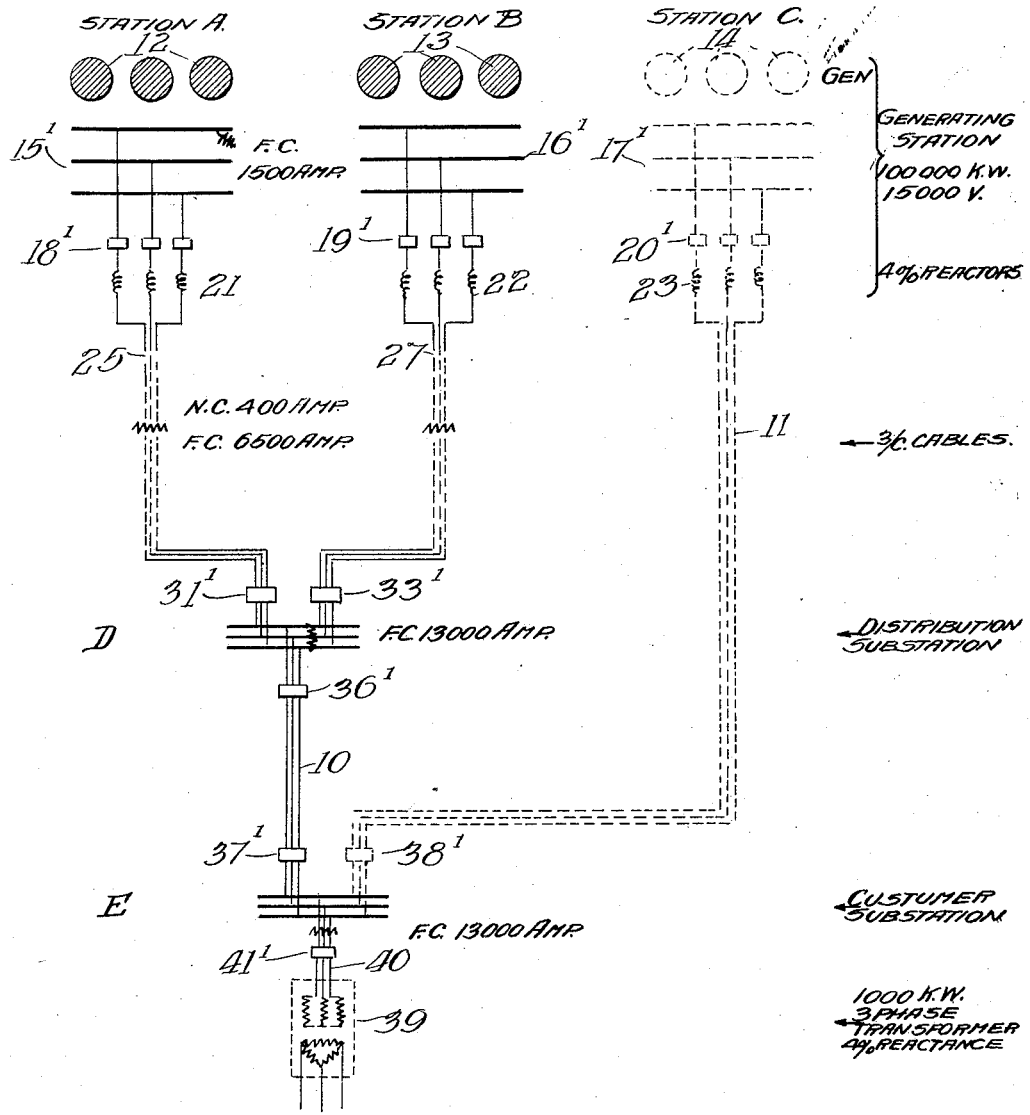

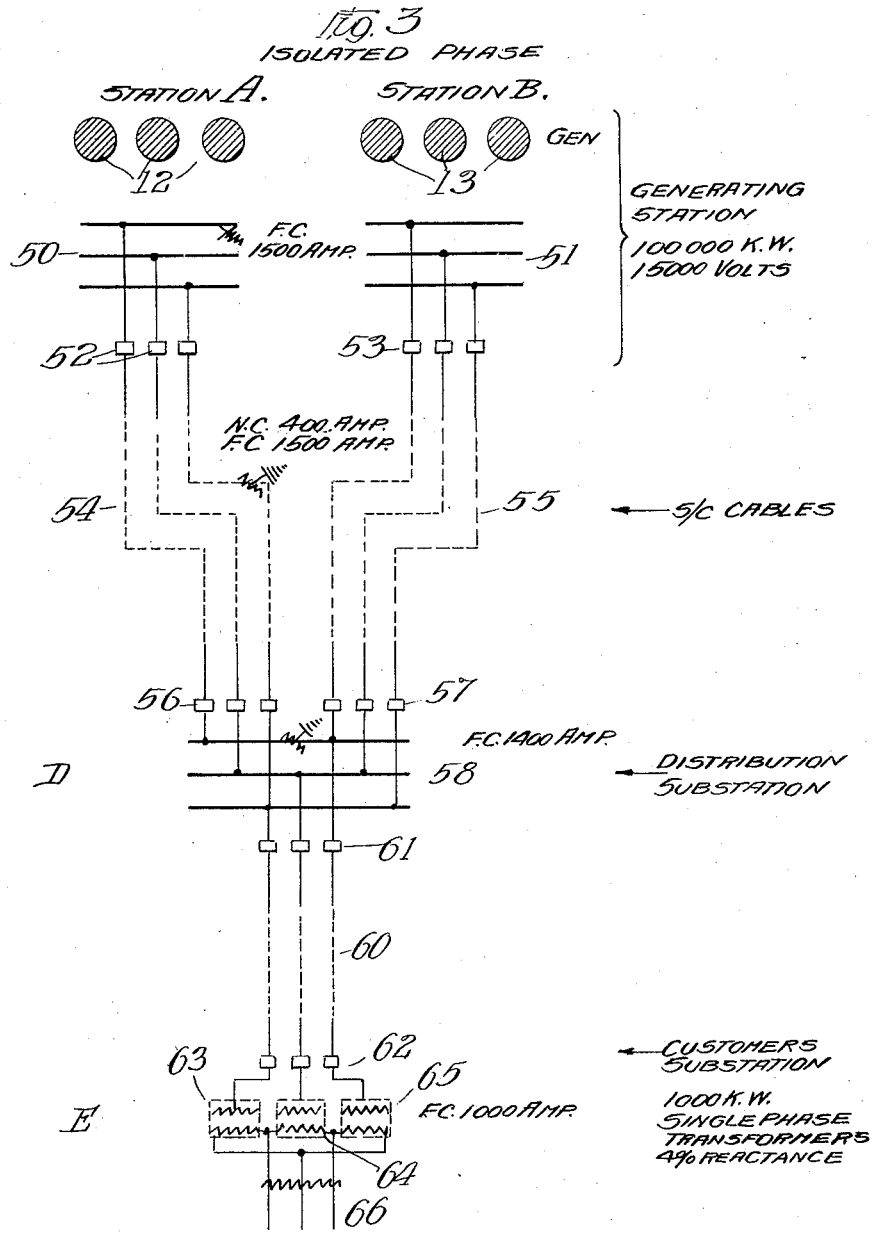

1,754,515

UNITED STATES PATENT OFFICE

BERTRAND G. JAMIESON, OF HOLLYWOOD, ILLINOIS, ASSIGNOR, BY MESNE ASSIGNMENTS, TO GENERAL ELECTRIC COMPANY, A CORPORATION OF NEW YORK

ELECTRIC POWER DISTRIBUTION

Application filed August 11, 1924. Serial No. 731,268.

My present invention relates to electric power distribution. More specifically it provides a system for distributing electric power from a central station directly to a customer or through another distributing center through an extension of the principles of phase isolation first disclosed in my prior Patent No. 1,454,744 granted May 8, 1923.

According to my present invention I extend phase isolation to the transformers of the customer. The system may extend from one station to another and from there to the customer, but the real merit of the invention is in virtual extension of the central station to a customer or distributing center as an isolated phase system.

In order to make clear the character of the present invention and the reasons for its introduction I shall briefly discuss certain phases of the art of electric distribution which I believe are necessary for an understanding of the present development.

In the art of generating and distributing electric energy it has for some time been appreciated that considerable economies of operation and distribution can be accomplished by interconnection.

In general, this has necessitated increase of voltage for economical transmission over an extended area and it has necessitated concentration of power upon the distributing centers. Where the amount of power consumed within a limited area is relatively large this has heretofore resulted in a cable system employing three conductor, three phase high tension cable and distribution to customers at primary voltage.

In such a cable system where the capacity approaches one hundred thousand K W or is even less, there arises a liability which begins to threaten any further enlargement or interconnection of the system.

As now designed every increase of power concentration through parallel operation increases the liability of loss to property, service and life.

Now the chief object of the present invention is to provide a structure or system in which increased capacity does not increase liability to loss and damage. That is to say, I provide a system which is designed with inherent characteristics such that short circuits originating from internal causes cannot occur on the primary system and such that those which occur on the secondary system are reduced by transformer reactance to values approaching normal load values on the primary system. In the system of my invention the cost of the system is devoted practically entirely to the distribution of electricity instead of in a substantial amount to the protection of the system from itself.

The great trouble with generating and distributing systems as now constructed is that the more generating capacity that is connected together in parallel, the greater is the damage that can be done by an interphase fault at any point in the system. Where current is distributed to the consumer at primary voltage and the system is not protected by phase isolation, a fault of interphase character anywhere upon a primary line will develop a current flow in general which tends to approach the generating capacity of the system.

Now in order to acquaint those skilled in the art with the manner of constructing and operating a system according to my invention, I shall now describe, in connection with the accompanying drawings, first a system operated in accordance with the prior art and then a system embodying my invention.

Fig. 1 is a diagram of a system employing group phase transmission and a group phase bus arrangement at the stations;

Fig. 2 is a similar diagram of a system embodying group phase transmission and isolated phase arrangement at the generating stations;

Fig. 3 is a diagram of a system embodying my invention, employing isolated phase transmission and isolated phase arrangement of the bus system at each of the stations, and distribution centers;

Fig. 4 is a diagram of a system illustrating the use of a limited number of circuit breakers of interrupting capacity suitable for preventing possible damage to the generators;

Fig. 5 is a diagrammatic cross sectional view of a conduit for laying single phase cable; and Fig. 6 is a sectional view of a suitable support for single phase cable where the same is laid directly in the earth.

Referring now to Fig. 1, I have shown a typical system employing generating stations A and B tied to the bus system of a distributing station D. The distributing substation D is connected to the customer's substation E through a line 10 and this consumer's substation is tied to the remote generating station C through a line 11 which may lead through another distributing substation or be directly connected. Assume that the generators 12 at substation A are capable of generating 100,000 K W at 15,000 volts and, likewise, the generators 13 at station B and generators 14 at station C can supply like amount of power. These generators are connected through grouped bus phase conductors 15, 16 and 17 respectively, and from the busses lines lead out through the circuit breakers 18, 19 and 20 for the three stations with reactors 21, 22 and 23, respectively, in the lines of the respective stations. The distributing substation has grouped bus phase conductors forming the bus 24 and this bus system is connected by two lines 25 and 26 to the station A and by three lines 27, 28 and 29 to the generating station B. The single line 11 of station C is connected to the busses 30 of the customer's substation E. Circuit breakers 31—32 are arranged in the lines 25—26 and circuit breakers 33, 34 and 35 are arranged in the lines 27, 28 and 29 where these lines are connected to the bus at the distributing station D. The line 10 which connects the distributing substation bus to the consumer's substation bus has circuit breakers 36 and 37 at the ends thereof. The line 11 extending between station C and substation E contains the circuit breaker 38.

The apparatus at the customer's premises includes the transformer bank 39 connected through the line 40 and circuit breaker 41 to the bus 30. We will assume an average case when this bank of transformers comprises a 1,000 K W three phase transformer having four per cent reactance. We will assume also that the reactors in the lines from the generating station to the substation include four per cent reactance. The reactors 21, 22 and 23 may be of any well known type and are generally included in the lines where they enter the generating station or in the reverse direction just before the conductor of the line goes into cable.

Now for the sake of understanding what can happen, assume that there is an interphase short circuit, as indicated on the generator busses 15. If this occurs, the fault current will be of the order of 33,000 amperes where only the stations A and B are interconnected.

Likewise, if a fault occurs in the line 40, or on the primary of transformer 39, at the substation the interphase fault current is equal to that at the generating station. Where the third station, such as generating station C is tied in to the customer's substation E, the fault current may be increased by 50% over that which would occur at the generating station.

I have indicated at various points the resulting fault current for faults occurring at different parts of the system. It will now be seen that with the group phase arrangement as provided for in the prior art, any customer's substation where primary voltage distribution is provided, the circuit breaker, such as the circuit breaker 41, must be prepared to interrupt substantially the entire energy of the system. If there are a number of such substations it will be seen at once that the expense of installing circuit breakers becomes very high. That is to say, the so-called energy repression charge begins to mount very rapidly and forms a very substantial part of the total investment. Not only is it necessary that each of the circuit breakers such as 18, 19 and 20 be sufficient to interrupt the normal current or the full current of its own generating station, but it must be capable of interrupting the current flow from interconnected generating stations. Thus the greater the connected generating capacity, the greater is the cost of the energy repression factor.

It will be obvious that if a substation or a customer's station were supplied from a single generating unit, then the only interrupting capacity required in the circuit breaker which would be necessary would be that for cutting off the generator from the substation in case of a fault. As the generating capacity is increased, the energy repression factor rises and at the same time there is greater capacity for damage and interruption of service because each line then becomes a potential source of a system fault.

The cables 25, 26, 27, 28 and 29 each become a basis for a system fault of a character which would disturb service anywhere on the system.

Attempts heretofore have been made to secure some measure of protection by sectionalizing the system. While this does decrease liability at any point, it very definitely increases the investment in the distributing system as a whole, as well as in the power station. It is common practice to go half way with the scheme of sectionalizing by interconnecting the sections of systems through reactors. This increases the utility of the sectionalized system to an extent, but it also very definitely lessens its utility as compared with a system freely connected and operated in parallel. The introduction of the additional reactance is not desirable; also line reactors or other excess energy absorbing devices at power centers or at substations are fully effective only if interconnections beyond are avoided. The three phase transformer is cheaper than three single phase transformers, but a three phase transformer in systems of the prior art has constituted a distinct liability because of the danger of developing an interphase fault.

In Fig. 2, I have illustrated a system like that shown in Fig. 1 except that the bus phase conductors at the generating station have been protected by phase isolation and reactors in the lines before they leave the station. Therefore, no interphase short can develop in the central station. The busses in the generating stations are protected by the circuit breakers 18', 19' and 20' which, as will be apparent, must have an interrupting capacity great enough to clear the fault current in the cables 25, 27 and 11.

Now referring to Fig. 3, I have shown a system embodying my invention. In this case the generating stations A and B have isolated phase busses 50 and 51 at the respective generating stations to which the generators 12 and 13 are connected. Since these bus phase conductors are isolated, interphase faults cannot be developed and the only fault current which can be developed is of a low value and consists of a fault to ground. The circuit breakers 52 and 53 are connected in the single phase cable lines 54 and 55 and these circuit breakers may have a relatively low interrupting capacity. Reactors in the lines are not required.

The lines 54 and 55 comprise single phase cables isolated from each other by sufficient distance to insure safety. Circuit breakers 56 and 57 are arranged at the substation ends of these lines and as previously explained, the required interrupting service for these circuit breakers is relatively low. At the distributing substation D the bus system 58 comprises isolated but phase conductors of the character disclosed in my above mentioned patent. The line 60 leading from the substation D to the customer's substation E comprises single phase cables suitably isolated for protection. The circuit breakers 61 and 62 at opposite ends of the line are similarly of relatively low interrupting capacity. The line 60 leads to the three single phase transformers 63, 64 and 65, which are connected to the low tension line 66. This low tension line may lead to suitable bus bars which are preferably isolated in accordance with the teaching of my aforesaid patent.

Now it will at once be apparent that circuit breakers of large interrupting capacity in the lines or beyond are not universally required in this system, because the only interphase fault which is likely to occur is upon the secondary side and this cannot rise to any great value because of the limitation inherent in the system. The separation of the individual phase conductors in lines 54, 55 and 60 as well as on the bus bars introduces additional reactance which prevents excessive current flow. At the same time the reactance of the single phase transformers 63, 64 and 65 is highly effective in limiting current flow throughout the system. Thus the fault current which can flow has been reduced to a small part of the fault current which could be created in systems of the prior art. As a consequence, the energy repression charge for reactors and circuit breakers has been greatly reduced and a simplified system is the result. Since the separate conductors of the line 60 leads into individual single phase transformers and there is no connection anywhere in the primary system between phases except on neutral points of the generator and transformer windings, the system inherently provides for safety throughout.

Where the system or a part of the system has such electrical constants or dimensions as to render it inherently safe or self-protective, phase isolation of such system or such part of the system, is not necessary. For example, assume that a transmission line fifty miles long leads to a remote station. Now it will be apparent that a fault occurring at the remote end of the line could not develop sufficient current flow to endanger the generating station. Hence, phase isolation would not need to be extended beyond the point where the included reactance of the system would inherently limit the possible fault current to a safe value.

The same thing is true in any case in which the interconnected systems are of such character that they possess inherent limitations to excessive current flow.

As above explained, where phase isolation is maintained in the station and on the lines to the transformer windings, the danger of serious damage to the system as by an interphase short, is reduced to a remote possibility.

However, even such remote possibility is guarded by a further safeguard by employing switches in the station, as illustrated at 75, in the diagram of Fig. 4, to disconnect the source of current supply in the event of some otherwise uncontrollable flow of current. These switches 75 which connect the generators 76 or other source of current to the busses 77 and 78, are of large capacity for interrupting current flow. Being of large capacity for breaking current flow, they are consequently expensive, but the number required is not great. They should be of a capacity great enough to cut off their connected source of current flow or any inflow of current, into a fault developing in the source of current. Thus, by the provision of a few high duty circuit breakers, the ultimate safety of the system is assured.

I provide reactors 79 in the generator leads 80, as explained in my aforesaid patent, to limit the inflow of current in case of a fault in the generator. If a different source of current is employed, either the same use of reactors for limiting current flow or the inherent safety of the system, as above explained, or phase isolation should be observed, or the advantages of my invention are not fully realized.

As above explained, where the lines are put under ground, single phase cable is employed. Where the cables are laid in ducts, as shown in Fig. 5, the cables of a line may be spaced on centers approximating 2 to 4 diameters. Thus, the single phase cables 100A, 100B and 100C are disposed in the ducts of the conduit 101 at the corners of a triangle to preserve a substantial electrical balance. If it is necessary to dispose the cables of a line in an unsymmetrical manner, as, for example, in the lower three ducts of the conduit 101, transposition may be employed to maintain the electrical balance.

Where the line is buried directly in the ground without being placed in conduit, the spacing of the cables is preferably made greater than the spacing in ducts. For example, suitable spacers 102, for supporting the cables 103A, 103B and 103C may be employed. Such spacers are preferably made of non-conducting material to reduce the possibility of electrical losses.

In addition to the use of transposition to maintain electrical balance, I find it advisable to ground one and preferably both ends of a cable whenever the connection thereto is opened.

The generators are preferably Y connected with grounded neutral. A small ohmic resistance in the neutral connection is preferable. Some current limiting agency in the ground connection is desirable for limiting current flow on a phase to ground fault. An ohmic resistance is not the only means that can be employed, but it is simple, inexpensive, and has in the past proven to be entirely satisfactory.

While the broad feature of phase isolation of a generating or substation has been disclosed and claimed in my above mentioned patent, I believe it is broadly new in the present invention to provide for extension of the isolated phase characteristics from station to station or from a station to the consumer's premises. The system shown in the above diagram of Fig. 3 has primary voltage extending to the single phase transformers on the premises of the customer. No reactors are required and circuit breakers of relatively small current interrupting capacity only are required. Single phase underground cable is used on the cable system and such cables of the same phase may be grouped together in conduits without incurring any liability of interphase connections. Joints are thereby simplified and a greater factor of safety of the insulation can easily be secured.

By arranging the primary system so that no interphase fault can occur thereupon the system is free of the dangers attending ordinary interconnection. Unlimited interconnection may be employed without any increased danger.

From the description thus far given, it may be seen that the term "phase isolation" is used to include the idea of separation, but it includes more than that. Effective separation comes nearer to describing what it means, and if it were not for the fallibility of the word the term "absolute separation" might describe it. True phase isolation means effective isolation by distance or impervious barriers against the effects of heat, mechanical disruption, magnetic forces, and the degradation of the ambient dielectric for the entire period of the sustained arc following the fault, all as referred to in the specification of Patent 1,454,744, of May 8, 1923. It differs not so much in structural characteristics from the conventional constructional methods formerly employed, as it does in the function of affording completeness of protection and resistivity to destruction.

I do not wish to be limited to the details shown or described, except as the same appear in the appended claims.

I claim:—

1. A three-phase alternating current transmission system comprising a central station and a consumers station, bus bars at the central station protected by phase isolation, a single-phase transformer at the consumers station for each phase and isolated phase conductors connecting the bus bars with the transformer, said conductors comprising single phase underground cables.

2. A three-phase alternating current generating and transmission system comprising a central station and a customers station, a bus system at the central station comprising isolated phase bus conductors, a plurality of generators connected in parallel to the bus conductors, single-phase high tension transformers at the customers station, and isolated phase transmission conductors connecting the bus phase conductors with the primaries of the said transformer, said transmission conductors comprising single phase underground cables.

3. In a three-phase alternating current generating and transmitting system, the combination of a central station having a high tension bus system comprising isolated phase bus conductors, a plurality of generating units connected in parallel to said bus conductors, a customers station comprising voltage transformer means having primary high tension windings and low tension secondary windings, isolated phase transmission conductors connecting said bus phase conductors and said transformer means, said transmission conductors comprising single-phase underground cables.

In witness whereof, I hereunto subscribe my name this 7th day of August, 1924.

BERTRAND G. JAMIESON.